US008848747B2

(12) United States Patent
Zeng et al.

(10) Patent No.: US 8,848,747 B2
(45) Date of Patent: Sep. 30, 2014

(54) METHOD AND DEVICE FOR RECOVERING OTUK FRAME, AND SYSTEM FOR TRANSPORTING OTUK FRAME

(75) Inventors: Li Zeng, Shenzhen (CN); Chan Zhao, Shenzhen (CN); Changsong Xie, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 99 days.

(21) Appl. No.: 13/347,863

(22) Filed: Jan. 11, 2012

(65) Prior Publication Data

US 2012/0141116 A1  Jun. 7, 2012

Related U.S. Application Data

(63) Continuation of application No. PCT/CN2009/072805, filed on Jul. 17, 2009.

(51) Int. Cl.
*H04J 3/06* (2006.01)
*H04J 3/14* (2006.01)
*H04J 3/16* (2006.01)

(52) U.S. Cl.
CPC *H04J 3/14* (2013.01); *H04J 3/1652* (2013.01)
USPC .......................................... 370/509; 398/209

(58) Field of Classification Search
USPC ......... 370/290, 464, 465, 467, 509, 513, 514, 370/516, 535, 536, 537, 538; 398/140, 182, 398/202, 209
See application file for complete search history.

(56) References Cited

U.S. PATENT DOCUMENTS

| | | | |
|---|---|---|---|
| 6,985,549 B1 * | 1/2006 | Biracree et al. | 375/355 |
| 7,006,565 B1 | 2/2006 | Endres et al. | |
| 7,315,575 B2 | 1/2008 | Sun et al. | |
| 7,548,558 B2 * | 6/2009 | Rakib et al. | 370/466 |
| 8,054,853 B2 * | 11/2011 | Jones et al. | 370/458 |
| 8,199,782 B2 * | 6/2012 | Haas | 370/536 |
| 8,204,087 B2 * | 6/2012 | Shin et al. | 370/543 |
| 8,205,141 B2 * | 6/2012 | Caggioni et al. | 714/776 |
| 8,331,793 B2 * | 12/2012 | Takeuchi et al. | 398/140 |
| 8,446,906 B2 * | 5/2013 | Sprague et al. | 370/392 |

(Continued)

FOREIGN PATENT DOCUMENTS

| | | |
|---|---|---|
| CN | 1842221 A | 10/2006 |
| CN | 1984018 A | 6/2007 |

(Continued)

OTHER PUBLICATIONS

"Recent Advances in 100G OTN", Tomizawa et al., Mar. 26, 2009.*

(Continued)

*Primary Examiner* — Paul H Masur
*Assistant Examiner* — Michael Phillips

(57) ABSTRACT

A method for recovering an OTUk frame includes: receiving an optical signal sent by using a method of multi-lane distribution from the OTUk frame to an interface of an optical module; converting the optical signal into an electrical signal, performing electrical equalization and demodulation on the electrical signal, and recovering multi-lane data from the demodulated signal; aligning and rearranging the data on each lane, according to a lane sequence identifier included in an overhead frame header of the data on each lane; and recovering the OTUk frame according to the aligned and rearranged data. According to the present invention, lane rearrangement is performed by detecting the lane sequence identifier, and the recovery of the OTUk frame is achieved. Therefore, a training sequence overhead does not need to be additionally introduced, and the influence on the system performance is avoided.

5 Claims, 6 Drawing Sheets

(56) References Cited

U.S. PATENT DOCUMENTS

| | | | |
|---|---|---|---|
| 8,495,475 B2* | 7/2013 | Kubo et al. | 714/776 |
| 8,532,163 B2* | 9/2013 | Amirichimeh et al. | 375/219 |
| 8,594,140 B2* | 11/2013 | Zhang et al. | 370/537 |
| 8,681,818 B2* | 3/2014 | Aoki et al. | 370/474 |
| 8,705,581 B1* | 4/2014 | Haas | 370/536 |
| 2003/0120799 A1* | 6/2003 | Lahav et al. | 709/236 |
| 2004/0156325 A1 | 8/2004 | Perkins et al. | |
| 2005/0196176 A1* | 9/2005 | Sun et al. | 398/152 |
| 2007/0201308 A1* | 8/2007 | Wassermann et al. | 367/82 |
| 2008/0025730 A1* | 1/2008 | Giovannini et al. | 398/147 |
| 2008/0107422 A1* | 5/2008 | Cole | 398/135 |
| 2009/0169217 A1 | 7/2009 | Meagher et al. | |
| 2010/0046951 A1 | 2/2010 | Dong et al. | |

FOREIGN PATENT DOCUMENTS

| | | |
|---|---|---|
| CN | 101267386 A | 9/2008 |
| CN | 101471741 A | 7/2009 |
| EP | 1 499 048 A2 | 1/2005 |
| EP | 2 075 936 A2 | 7/2009 |

OTHER PUBLICATIONS

"SerDes chips for 100Gbps Dual-Polarization DQPSK", Chung et al., Mar. 26, 2009.*

International Search Report dated Apr. 29, 2010 in connection with International Patent Application No. PCT/CN2009/072805.

Written Opinion of the International Searching Authority dated Apr. 29, 2010 in connection with International Patent Application No. PCT/CN2009/072805.

Supplemetary European Search Report dated Sep. 3, 2012 in connection with European Patent Application No. EP 09 84 7229.

Masahito Tomizawa, et al., "Recent Advances in 100G OTN", 2009 IEEE, 4 pages.

Kun-Wook Chung, at al "SerDes chips for 100Gbps Dual-Polarization DQPSK", 2009 IEEE, 3 pages.

* cited by examiner

METHOD AND DEVICE FOR RECOVERING OTUK FRAME, AND SYSTEM FOR TRANSPORTING OTUK FRAME

CROSS-REFERENCE TO RELATED APPLICATIONS

This application is a continuation of International Application No. PCT/CN2009/072805, filed on Jul. 17, 2009, which is hereby incorporated by reference in its entireties.

TECHNICAL FIELD

The present invention relates to the field of communication technologies, and more particularly to a method and a device for recovering an OTUk frame, a device for sending an OTUk frame, and a system for transporting an OTUk frame.

BACKGROUND

As the service bandwidth develops rapidly, 100 G transporting technology is currently popular in an optical transport network. In order to achieve end-to-end transport of a service, presently, a 100 GB service is generally encapsulated into an OTU4, which is a 100 G OTN container (OTU4), and an OTU4 bit stream passes through a 100 G optical module and is converted into an optical signal for transport. High order modulation and coherent receiving manners are generally used to achieve high-speed and long-distance transmission.

In a process where the high order modulation and coherent receiving manners are used, generally, a transmitted electrical signal is electro-optically converted into a first transmitted optical signal Xout and a second transmitted optical signal Yout, where the first transmitted optical signal is in an X polarization state, the second transmitted optical signal is in a Y polarization state, and the Y polarization state is orthogonal to the X polarization state. The first transmitted optical signal Xout and the second transmitted optical signal Yout are combined by a combiner into one optical signal which is transmitted through an optical fiber. At a receiver end, the combined optical signal is split by a splitter into a first received optical signal X' in and a second received optical signal Y' in, where the first received optical signal is in an X' polarization state, the second received optical signal is in a Y' polarization state, and the Y' polarization state is orthogonal to the X' polarization state. The first received optical signal and the second received optical signal are electro-optically converted respectively into a first received electrical signal and a second received electrical signal. Original OTU4 data is then recovered according to the first received electrical signal and the second received electrical signal. In order to correctly and fully recover the original OTU4 data, the first received electrical signal and the second received electrical signal that are received at the receiver end should be respectively corresponding to the first transmitted optical signal and the second transmitted optical signal from a transmitter end.

Random birefringence may occur in the transmission of a light beam in an optical fiber, and cause crosstalk of the two orthogonal polarization states, so that the X' polarization state and the Y' polarization state at the receiver end include different components of the X polarization state and the Y polarization state, respectively. Therefore, the crosstalk components need to be eliminated by using an equalization method, so as to recover the original transmitted electrical signal corresponding to the X polarization state and the original transmitted electrical signal corresponding to the Y polarization state.

A commonly used equalization method is electrical equalization, where the first received electrical signal and the second received electrical signal are processed by digital filters of different coefficients (Hxx, Hxy, Hyx, and Hyy), to acquire the equalized first received electrical signal and the equalized second received electrical signal, from which the original first transmitted electrical signal and the original second transmitted electrical signal are split. An input signal for electrical equalization includes the original signal component from the transmitter end and the crosstalk signal component, and the two components are respectively present in different proportions in the input signal. The electrical equalization is characterized in that the equalized output signal is the signal corresponding to the component present in a major proportion. For example, in the case that the first received electrical signal includes the signal component corresponding to the X polarization state and signal component corresponding to the Y polarization state, where the signal component corresponding to the X polarization state is present in a major proportion and the signal component corresponding to the Y polarization state is present in a minor proportion, the equalized first received electrical signal is the first transmitted electrical signal corresponding to the X polarization state.

However, in implementing the present invention, the inventor finds that, in random birefringence occurring in the transmission of a light beam in an optical fiber, the proportions of the original signal component and the crosstalk signal component in the first received electrical signal and the second received electrical signal also change at random, so that the proportion of the crosstalk signal component in the received signal is greater than the proportion of the original signal component. Therefore, the corresponding relations of the equalized first received electrical signal and the equalized second received electrical signal output after electrical equalization to the first transmitted electrical signal and the second transmitted electrical signal at the transmitter also change at random. Accordingly, the correctness and integrity of the received signal are destroyed.

SUMMARY

The present invention provides a method and a device for recovering an OTUk frame, and a system for transporting an OTUk frame, so as to accurately recover the OTUk frame, even if a corresponding relation between an equalized received signal and a transmitted signal from a transmitter end changes.

A method for recovering an OTUk frame includes:

receiving an optical signal sent by using a method of multi-lane distribution from the OTUk frame to an interface of an optical module;

converting the optical signal into an electrical signal, electrically equalizing and demodulating the electrical signal, and then recovering multi-lane data from the demodulated signal; and aligning and rearranging the data on each lane according to a lane sequence identifier included in an overhead frame header of the data on each lane, and recovering the OTUk frame according to the aligned and rearranged data.

A device for recovering an OTUk frame includes:

a receiving module, configured to receive an optical signal sent by using a method of multi-lane distribution from the OTUk frame to an interface of the optical module;

an optical module, configured to convert the optical signal into an electrical signal, electrically equalize and demodulate the electrical signal, and recover multi-lane data from the demodulated signal; and an electrical module, configured to align and rearrange the data on each lane, according to a lane sequence identifier included in an overhead frame header of the data on each lane, and recover the OTUk frame according to the aligned and rearranged data.

A device for sending an OTUk frame includes:

an electrical module, configured to distribute the OTUk frame through round-robin distribution in a block mode to multiple lanes, where each lane includes frame header information, and the frame header information includes a frame header byte for identifying lane information; and an optical module, configured to perform bit multiplexing on K/N lanes, perform high-order modulation on the multiplexed signals, and combine the modulated signals into one optical signal for sending, where K is the number of the lanes and N is the order of the high order modulation.

A system for transporting an OTUk frame includes:

a sending device, configured to send an optical signal by using a method of multi-lane distribution from the OTUk frame to an interface of an optical module: and The receiving device, configured to convert the optical signal into an electrical signal, electrically equalize and demodulate the electrical signal, and recover multi-lane data from the demodulated signal; align and rearrange the data on each lane; and recover the OTUk frame according to the aligned and rearranged data.

The embodiments of the present invention have the following advantages over the prior art.

According to the embodiments of the present invention, an optical signal sent by using a method of multi-lane distribution from an OTUk frame to an interface of an optical module is received; after the optical signal is converted into an electrical signal, electrical equalization and demodulation is performed on the electrical signal, and multi-lane data is then recovered from the demodulated signal; the data on each lane is aligned and rearranged, according to a lane sequence identifier included in an overhead frame header of the data on each lane; and the OTUk frame is recovered according to the aligned and rearranged data. It can be known that OTN multi-lane distribution technology can be combined in the embodiments of present invention, so that the lanes may be rearranged by detecting the lane sequence identifiers, and the recovery of the OTUk frame is achieved, when a polarization state of a transmitted signal changes and an equalizer cannot quickly track the polarization change in time, which causes that the equalized polarized signal is inconsistent with the signal in the original polarization state. Therefore, a training sequence overhead does not need to be additionally introduced, and the influence on the system performance is avoided.

DETAILED DESCRIPTION

To make the objectives, features, and advantages of the present invention more comprehensible, the present invention is described below in detail with reference to embodiments and the accompanying drawings.

Figure 1:
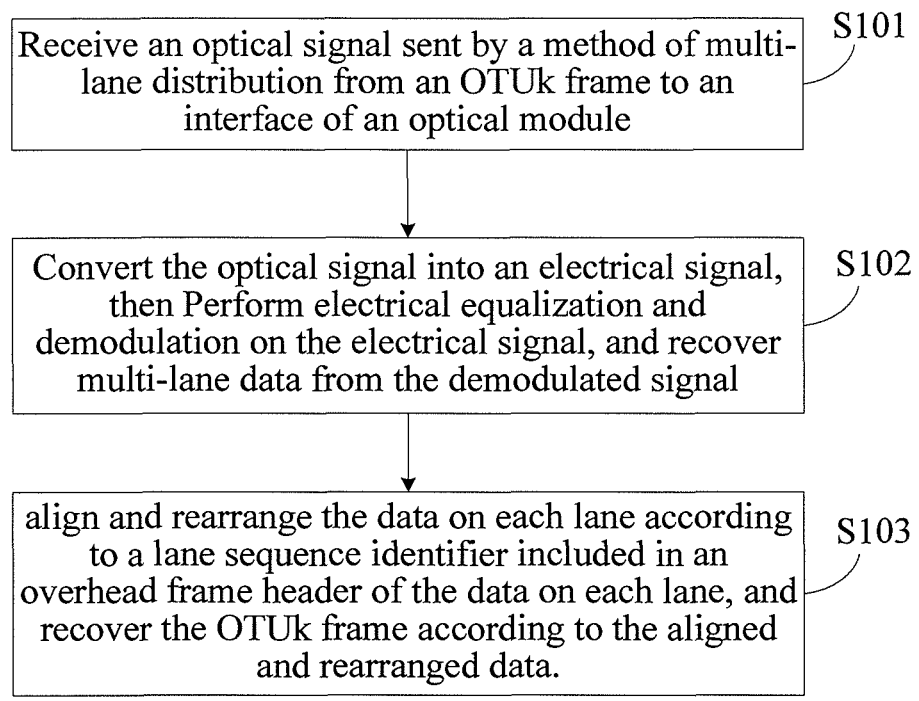
FIG. 1 is a flow chart of a method according to an embodiment of the present invention.

Referring to FIG. 1, an embodiment of the present invention provides a method for recovering an OTUk frame, which includes the following steps.

S101: Receive an optical signal sent by using a method of multi-lane distribution from the OTUk frame to an interface of an optical module.

The embodiment of the present invention is mainly applied in a 100 G transport technology. in the technology, in order to achieve end-to-end transport of a service, a standard defines an OTUk (k=1, 2, 3, 4) frame structure, so as to encapsulate an electrical signal in a standard OTUk frame format, before the electrical signal is converted into an optical signal and transported.

For example, a 100 GE service is generally encapsulated into a 100 G OTN container (OTU4) at present, and an OTU4 bit stream passes through a 100 G optical module and is converted into an optical signal for transport. That is, the electrical signal is encapsulated into an OTU4 frame before being converted into an optical signal for transport. The OTU4 frame structure has 4 rows in total, and each row includes 4080 bytes, where Columns 1 to 14 are a frame overhead, and Bytes 1 to 7 in Row one are an identifier of a frame header; Columns 15 to 3824 are an Optical channel Data Unit (ODU) bearing a 100 G service; and Columns 3825 to 4080 are FEC (Forward Error Correction, Forward Error Correction). The whole frame is of 16320 bytes and is transported in 1.168 μs, and thus the transport speed is 111.78 Gbit/s. For ease of description, all illustrations are made below with the OTU4 frame as an example.

A transmitter end sends the optical signal by using the method of multi-lane distribution from the OTU4 frame to the interface of the optical module. Specifically, the OTUk frame may be distributed through round-robin distribution in a block mode to multiple lanes, where each lane includes frame header information, and the frame header information includes a frame header byte for identifying lane information. K/N lanes undergo bit multiplexing, the multiplexed signals undergo high-order modulation, and the modulated signals are combined into one optical signal for sending, where K is the number of the lanes and N is the order of high order phase shift keying. For example, when QPSK (Quadrature Phase Shift Keying) modulation is performed, N=4 and K=20; in this case, 20/4 lanes undergo bit multiplexing.

Figure 2:
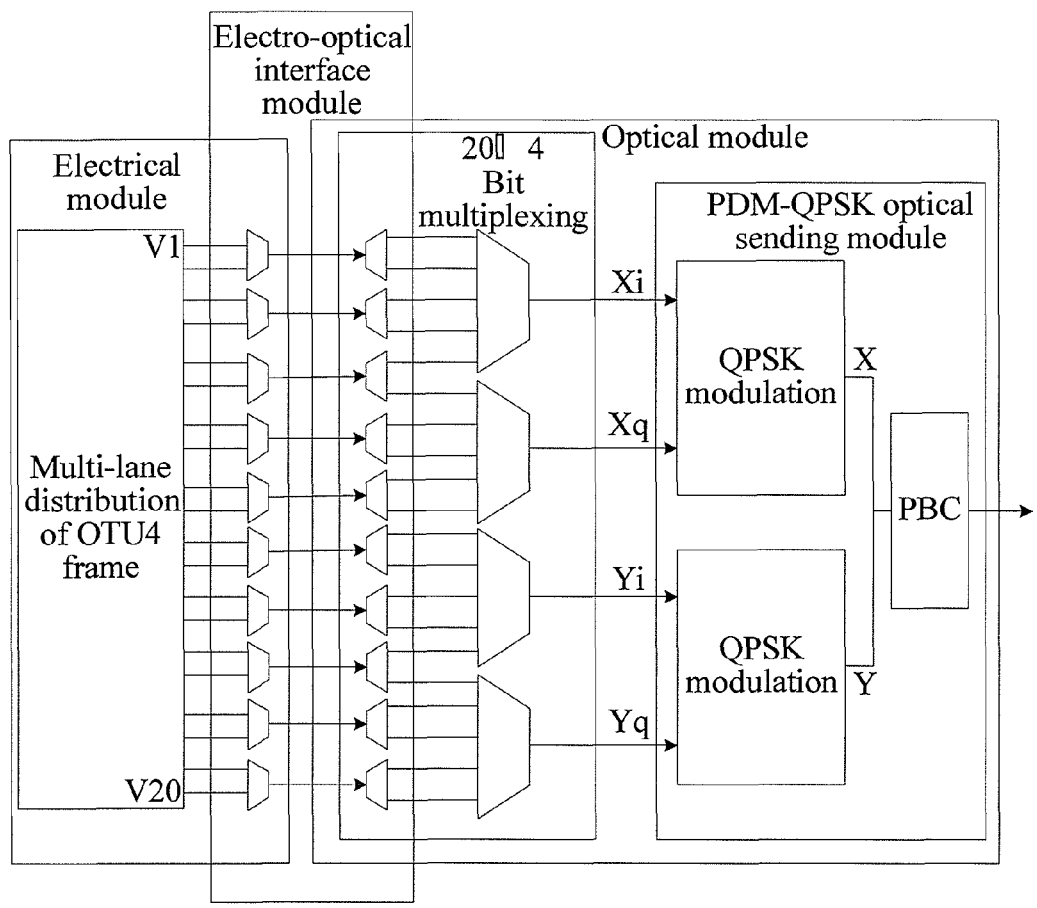
FIG. 2 is a flow chart of processing at a transmitter end in a method according to an embodiment of the present invention.

For example, in the multi-lane distribution from the OTU4 frame to the interface of the optical module, the method defined by ITU-T G.709 standard may be used. Referring to FIG. 2, assume that PDM-QPSK modulation manner is adopted. In this method, in an electrical processing module, an OTU4 frame of 100 G may be sent to 20 lanes, that is, distributed through round-robin distribution to 20 lanes in a Block (for example, 16 bytes) mode. After 20 OTU4 frames are distributed, each lane is ensured to have one piece of frame header information MFAS (referring to the distribution method defined in ITU-T G.709 recommendation), and in the MFAS, a frame header byte A2 (the 6th byte) is carried to identify the Lane information. Subsequently, through an electro-optical interface module, 20/4 lanes are multiplexed through bit multiplexing to one of input signals $Xi$, $Xq$, $Yi$, and $Yq$ of an optical processing module. $Xi$ and $Xq$ undergo QPSK modulation through a PDM-QPSK optical sending module, and are combined into a first transmitted signal X; likewise, $Yi$ and $Yq$ undergo QPSK modulation, and are combined into a second transmitted signal Y, and the two signals are respectively in an X polarization state and in a Y polarization state, and are multiplexed to one high-speed optical signal.

Furthermore, in addition to the PDM-QPSK modulation manner, the embodiment of the present invention is also applicable to other transmission technologies of polarization multiplexing and high order modulation, where the high order modulation includes various types of phase modulation, for example, BPSK and 8PSK, or other amplitude modulation technologies, such as 8QAM and 16QAM technologies. The only difference from the QPSK modulation manner is the variation of the number of the electro-optical interfaces. For example, the number of the electro-optical interfaces of PDM-8PSK is 6 (2 polarization directions, each providing 8 phases of modulation through a 3-bit interface). Correspondingly, the OTU4 frame multi-lane distribution process performed by the transmitter end is as follows.

An OTU4 frame of 100 G is sent to 30 Lanes, that is, distributed through round-robin distribution to 30 Lanes in a block (for example, 16 bytes) mode. After 30 OTU4 frames are distributed, each lane is ensured to have one piece of frame header information MFAS. In the MFAS, a frame header byte A2 (the 6th byte) is used for identifying Lane information. 30/6 Lanes are multiplexed through bit multiplexing to an input signal of the optical module.

It can be known that when the optical signal is sent by using the method of multi-lane distribution from the electrical signal to the interface of the optical module, the OTU4 frames are distributed to each lane in a certain sequence, and the overhead frame header of each lane includes a lane sequence identifier.

S102: Convert the optical signal into an electrical signal, perform electrical equalization and demodulation on the electrical signal, and then recover multi-lane data from the demodulated signal.

In order to combine the high order modulation and coherent receiving process with the method of multi-lane distribution from the OTUk frame to the interface of the optical module, in the embodiment of the present invention, the optical processing module is modified, so that after receiving the optical signal sent by using the method of multi-lane distribution from the OTUk frame to the interface of the optical module, a receiver end converts the optical signal into an electrical signal, performs electrical equalization and demodulation, and then recovers multi-lane data. Specifically, if the transmitter end uses the K/N lanes for bit multiplexing, performs high order phase shift keying modulation on the multiplexed signals, and combines the modulated signals into one optical signal for sending; the step of recovering the multi-lane data may be: performing bit demultiplexing on each demodulated signal to recover multi-lane data (in the prior art, after demodulating and recovering the above four signals, demultiplexing of the signals is generally performed in manners such as 1:n serial/parallel conversion).

Figure 3:
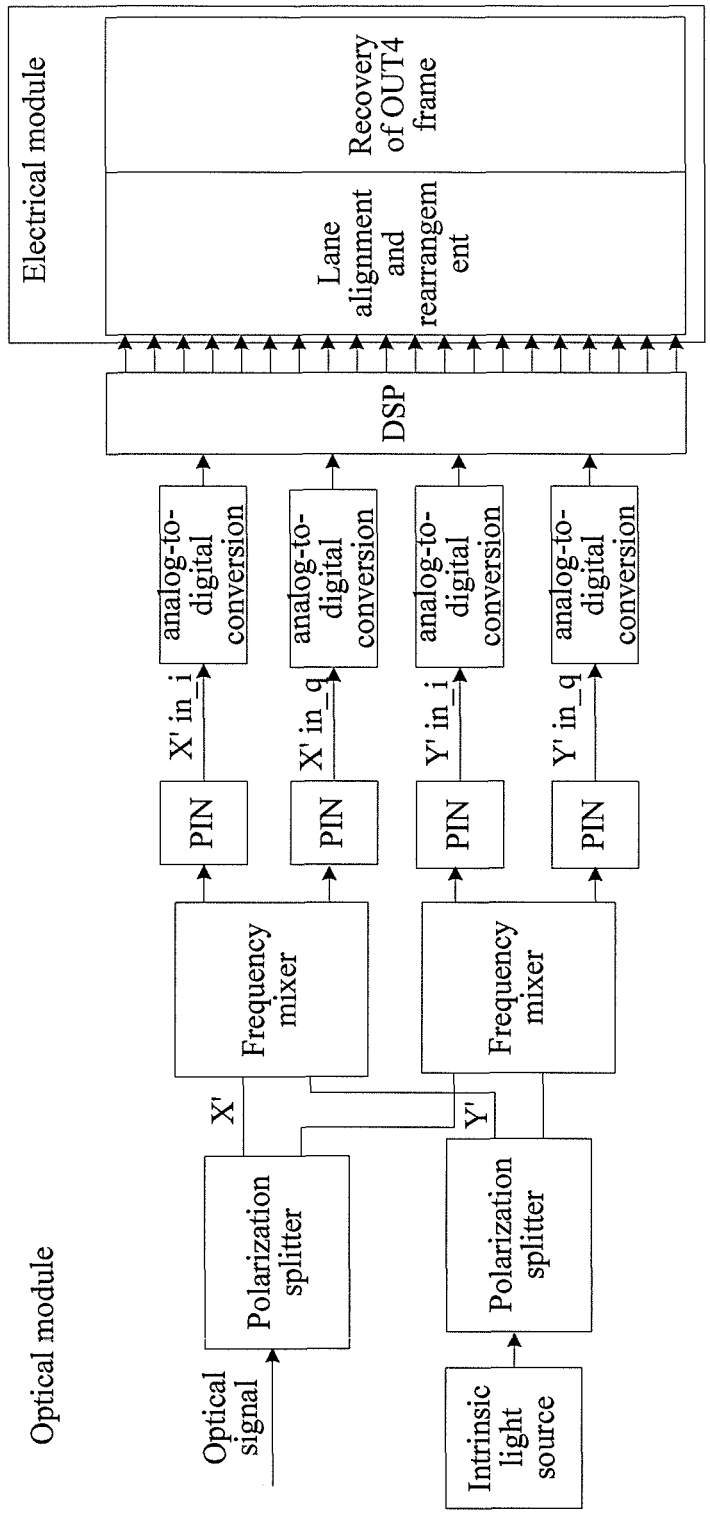
FIG. 3 is a flow chart of processing at a receiver end in a method according to an embodiment of the present invention.

For example, referring to FIG. 3, at the receiver end (the receiver end is corresponding to the transmitter end as shown in FIG. 2), the optical signal passes through a polarization splitter, and two signals from the transmitter end are split into X' and Y' signals. The polarization splitter uses an intrinsic light source having the same frequency as an optical carrier signal to coherently mix the two split received optical signals through a frequency mixer, so as to recover the signals in the X polarization state and in the Y polarization state (including channel noises and crosstalk of the polarization-state signals). The two optical signals X' and Y' are converted through analog-to-digital conversion into digital signals, which need to be electrically equalized in a digital signal processing (DSP) module to have the noises and the crosstalk of the polarization-state signals on the transmission channel eliminated, then recovered into two electrical signals X' and Y' (with the crosstalk of the two polarization-state signals eliminated), and demodulated respectively so as to recover signals X'out_X'out_q, Y'out_i, and Y'out_q. Afterward, the demodulated and recovered signals undergo bit demultiplexing to recover 20 Lane data.

The bit demultiplexing is corresponding to the bit multiplexing at the transmitter end. As the transmitter performs 20/4-bit multiplexing on multi-lane data and then modulates the multiplexed data as shown in FIG. 2, the modulated and recovered signals may be recovered into the 20-lane data after being bit demultiplexed.

S103: Align and rearrange the multi-lane data according to a lane sequence identifier included in an overhead frame header of the data on each lane, and recover the OTUk frame according to the aligned and rearranged data.

Due to operations such as system transmission and electrical equalization, delay and mis-sequence may occur to the recovered data among each Lane. In this case, a method used in the embodiment of the present invention is that the alignment of the data among each Lane and the rearrangement of the lane sequence are completed by using Lane identifiers. Thereby, the OTUk frame can be recovered according to the aligned and rearranged data.

If the transmitter end distributes the OTUk frame through round-robin distribution in a block mode to the multiple lanes, block multiplexing of the Lane data after rearrangement may be performed, so that the complete OTUk frame is recovered. The specific block multiplexing process may be combining the data on each lane in the sequence after data alignment and rearrangement, so as to recover the complete OTU4 frame.

For example, due to a transient effect of a transmission channel, the X-state polarization and the Y-state polarization are inversed, so that when an equalizer cannot respond to the parameter change of the channel in time, that is, when X'out=Yout and Y'out=Xout occur, the corresponding relations between the equalized output signals and the original signals from the transmitter end also change. In this case, a method provided in the embodiment of the present invention is: demodulating the equalized signals, perform bit demultiplexing on the demodulated signals for recovery into 20 Lane signals, detecting Lane identifier information, and rearranging each Lane signal according to the identifier information, so as to recover the OTU4 frame.

The identifier information of each lane may be acquired in the following manner: searching the frame header of each lane, where particular frame header bytes A1 (0xF6H) A2 (0x28H) are included in each frame header MFAS; searching for these bytes, where when one or more A1A2 bytes are continuously detected, a frame header signal is searched out, and then detecting a byte for identifying lane information (the 6th byte), so as to acquire the lane identifier information.

It can be known that in the method according to the embodiment of the present invention, though delay and missequence of the data among each lane may still occur in the transmission and equalization processes, no bit error exists in the eventually recovered OTU4 data. The reason is that, the OTN multi-lane distribution technology can be combined in the embodiment of the present invention, so that the lanes may be rearranged by detecting the lane sequence identifiers, and thereby the recovery of the electrical signal is achieved, when the polarization state of the transmitted signal changes, and the equalizer cannot quickly track the polarization change in time, which causes that the equalized polarized signal is inconsistent with the signal in the original polarization state.

In addition, in a method used in the prior art to solve the potential random change of the corresponding relations in the electrical equalization by adding a training sequence overhead (SYNC), the complexity of DSP processing is increased, as the training sequence needs to be continuously detected and data switching is performed according to the detection result, when the signal at the transmitter end varies from the original signal at an output end. However, in the embodiment of the present invention, the training sequence overhead does not need to be additionally introduced, as the problem of the potential random change of the corresponding relations that occurs in the electrical equalization may be solved by using its own overhead of an OTN data frame at an electrical layer, and therefore the complexity of DSP processing is not increased. Meanwhile, the system performance is not affected, the bandwidth of support apparatus does not need to be improved, and the apparatus cost is not increased.

The optical module needs to continuously detect, in the equalization process, the proportions of the original signal component and the crosstalk signal component, and adjust the filter coefficient of the equalizer, so as to gradually decrease the crosstalk signal component. Currently, generally used algorithms for updating the coefficient of an equalizer include the CMA (Constant Modulus Algorithm) and LMS (Least Mean Square). The CMA is simpler, and can easily split the original signal component from the crosstalk signal component, but has a low coefficient convergence rate; while the LMS can quickly update the coefficient of the equalizer, and quickly decrease the crosstalk signal component. When the proportions of the original signal component and the crosstalk signal component are high, bit errors may occur to the data on each lane, and the data cannot be identified. When the original signal component is preliminarily split from the crosstalk signal component, the bit error rate of each lane is lower, and the probability of detecting the special bytes (for example, the frame header) in the data on each lane is greatly increased. When the original signal component is completely split from the crosstalk signal component, substantially no bit error occurs to the data on each lane. Therefore, the adjustment of the equalizer algorithm may undergo feedback control by detecting the bit error performance of each lane. For example, when the bit error rate is judged to be low, it is considered that the original signal component and the crosstalk signal component are preliminarily split. In this case, an equalizer algorithm having higher convergence efficiency should be switched to, so as to raise the split rate of the signal from the noises.

Therefore, in the embodiment of the present invention, the bit error performance of each lane may be further detected, and the equalizer algorithm undergoes feedback control by using the performance detection result. Various methods may be used for detecting the bit error performance of each lane, including, for example, recovering the multi-lane data through bit demultiplexing, and then searching the overhead frame header including the lane sequence identifier in the lane data, where if the frame header information is searched out, it is indicated that the bit error rate of the lane is low, and a current equalizer algorithm A completes the preliminary split of the original signal component from the crosstalk signal component; in this case, an equalizer algorithm B having higher convergence efficiency is switched to, so as to raise the split rate of the signal from the noises by the equalizer.

Figure 4:
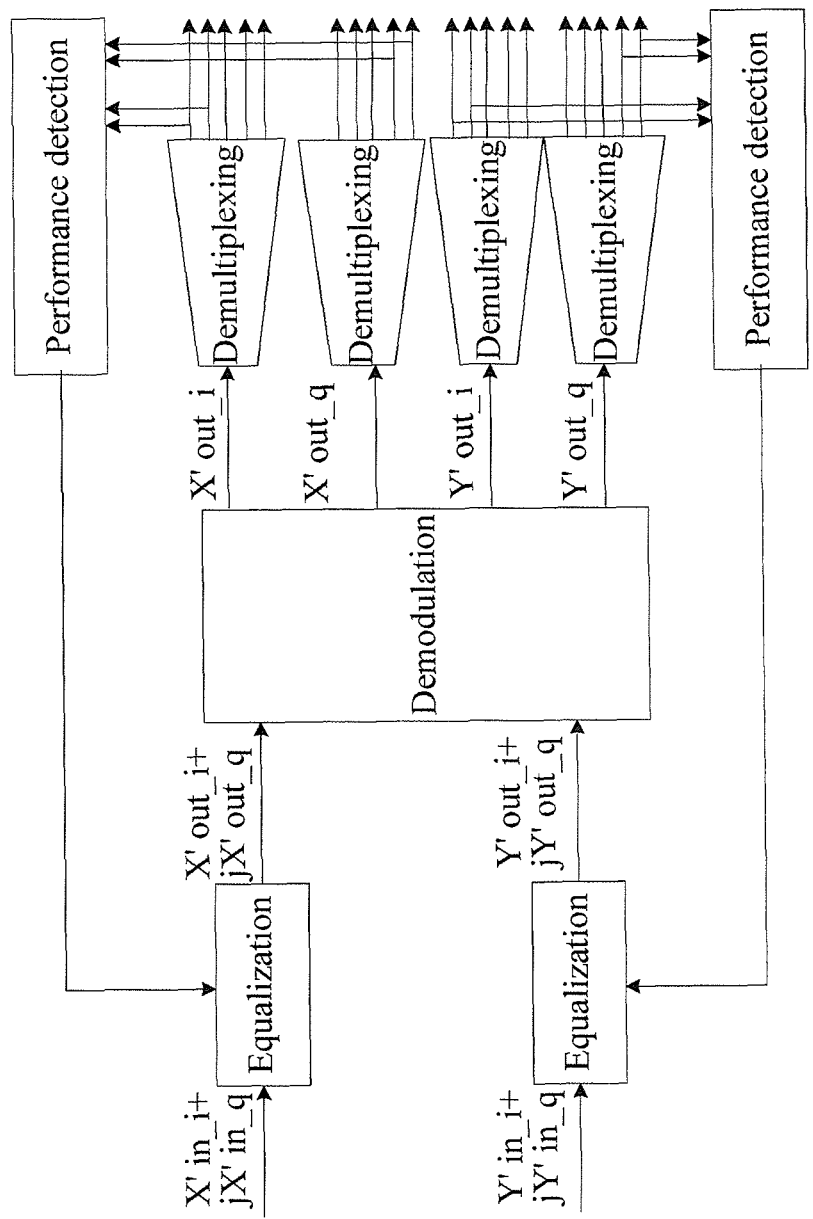
FIG. 4 is a flow chart of processing in a DSP module at a receiver end in a method according to an embodiment of the present invention.

Specifically, referring to FIG. 4, a DSP processing module of the optical processing module at the receiver end as shown in FIG. 3, includes an equalizer, where the equalizer is configured to eliminate the channel noises from the received signal, and track the parameter change of the channel by real-time calculation. When the received signal is processed in an electrical equalization mode, the signal and the noises are preliminarily split by the constant modulus algorithm (CMA). Due to the elimination of the majority of the noises, the signal is substantially recovered, and then demodulated to undergo phase recovery and data judgment. The demodulated four electrical signals further undergo respectively bit demultiplexing, so as to be recovered into Lane data. In this case, the frame header of the data on each Lane is detected (not completely shown in the drawing), and if the frame header information is searched out, it means that the equalized result by the constant modulus algorithm is converged, and the signal is preliminarily split from the noises. Therefore, if X' or Y'-related Lane frame header information is detected, the switching of the control algorithm of the equalizer is triggered, for example, switching to the least mean square (LMS), so that the signal is further split from the noises, until the signal is fully recovered. Definitely, an X' or Y' lane-related equalizer is notified of switching the equalizer algorithm, after the frame header information is searched out on one or a part of the lanes (instead of all the X' or Y'-related Lanes).

Other bit error detection methods may also be used, for example: aligning and rearranging multiple lanes, recovering the OTUk frame, using OTUk frame FEC (3825 to 4080 bytes) to calculate and count the bit errors so as to calculate the bit error number and bit error rate of each lane, setting an bit error rate threshold, and perform feedback control on the equalizer algorithm according to the result.

Figure 5:
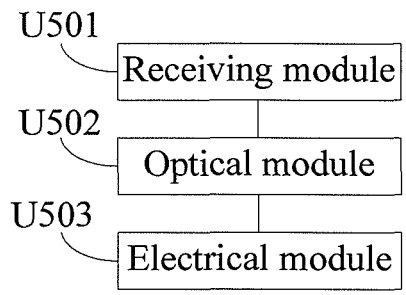
FIG. 5 is a schematic diagram of a device for recovering an OTUk frame according to an embodiment of the present invention.

Corresponding to the method for recovering the OTUk frame according to the above embodiment of the present invention, an embodiment of the present invention further provides a device for recovering an OTUk frame, where the device is located at a receiver end. referring to FIG. 5, the device includes:

a receiving module U501, configured to receive an optical signal sent by using a method of multi-lane distribution from the OTUk frame to an interface of the optical module;

an optical module U502, configured to convert the optical signal into an electrical signal, perform electrical equalization and demodulation on the electrical signal, and then recover multi-lane data; and an electrical module U503 is configured to align and rearrange the data on each lane, according to a lane sequence identifier included in an overhead frame header of the data on each lane, and recover the OTUk frame according to the aligned and rearranged data.

A transmitter end sends the optical signal by using the method of multi-lane distribution from the OTUk frame to the interface of the optical module. After being received by the receiving unit U501 at the receiver end, the optical signal is first converted by the optical module U502 into an electrical signal, which is electrically equalized and demodulated, and then multi-lane data is recovered. After the multi-lane data is recovered, delay or mis-sequence of the data may occur, and when the optical signal is sent by using the method of multi-lane distribution from the OTUk frame to the interface of the optical module, each lane provides an overhead frame header including a corresponding lane sequence identifier; therefore, after the multi-lane data is recovered, the data on each lane may be aligned and rearranged by the electrical module U503 according to the sequence identifier included in the frame header of each lane. Finally, the complete OTUk frame may be recovered according to the aligned and rearranged data.

If the method of multi-lane distribution from the OTUk frame to the interface of the optical module includes: distributing the OTUk frame through round-robin distribution in a block mode to multiple lanes, where each lane includes frame header information, and the frame header information includes a frame header byte for identifying lane information; performing bit multiplexing on K/N lanes, performing high-order modulating on the multiplexed signals, and combining the modulated signals into one optical signal for sending. Specifically, in the recovery of the multi-lane data, a manner of bit demultiplexing of the demodulated data may be used for the recovery of the multi-lane data; and in the recovery of the OTUk frame according to the aligned and rearranged data, block multiplexing may be performed on the aligned and rearranged data, so as to recover the complete OTUk frame.

Figure 6:
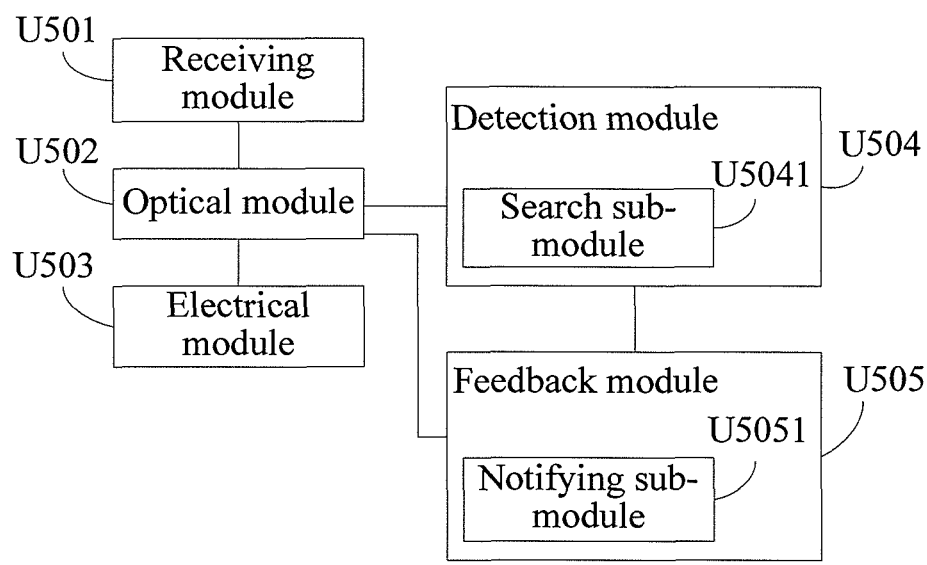
FIG. 6 is a schematic diagram of another device for recovering an OTUk frame according to an embodiment of the present invention.

In addition, in an embodiment of the present invention, feedback control may be performed on an equalizer by detecting a bit error performance of each lane. In this case, referring to FIG. 6, the system further includes:

a detection module U504, configured to detect the bit error performance of each lane, according to the recovered multi-lane data; and a feedback module U505, configured to perform feedback control on an equalizer algorithm using the performance detection result.

Various methods can be used for detecting the lane bit error performance, one of which is as follows.

The detection module U504 may include a search sub-module U5041, configured to search an overhead frame header including a lane sequence identifier in the lane data.

Accordingly, the feedback module U505 may include a notifying sub-module U5051, configured to notify the equalizer of switching to a control algorithm having higher convergence efficiency, if the information of the overhead frame header is searched out.

Figure 7:
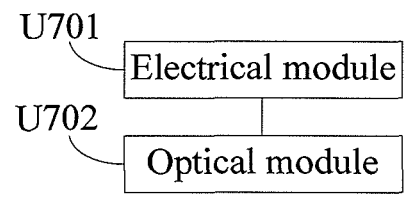
FIG. 7 is a schematic diagram of a device for sending an OTUk frame according to an embodiment of the present invention.

Corresponding to the device for recovering the OTUk frame according to the above embodiment of the present invention, an embodiment of the present invention further provides a device for sending an OTUk frame. Referring to FIG. 7, the device includes:

an electrical module U701, configured to distribute the OTUk frame through round-robin distribution in a block mode to multiple lanes, where each lane includes frame header information, and the frame header information includes a frame header byte for identifying lane information; and an optical module U702, configured to perform bit multiplexing on K/N lanes, perform high-order modulation on the multiplexed signals, and combine the modulated signals into one optical signal for sending, where K is the number of the lanes and N is the order of the high order modulation.

Figure 8:
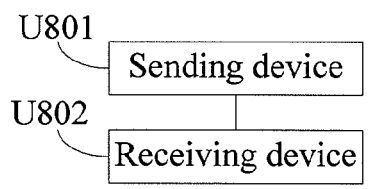
FIG. 8 is a schematic diagram of a system for transporting an OTUk frame according to an embodiment of the present invention.

Corresponding to the device for recovering the OTUk frame and the device for sending the OTUk frame according to the above embodiments of the present invention, an embodiment of the present invention further provides a system for transporting an OTUk frame. Referring to FIG. 8, the system includes:

a sending device U801, configured to send an optical signal by using a method of multi-lane distribution from the OTUk frame to an interface of an optical module; and a receiving device U802, configured to convert the optical signal into an electrical signal, perform electrical equalization and demodulation, and recover multi-lane data from the demodulated signal; align and rearrange the data on each lane; and recover the OTUk frame according to the aligned and rearranged data.

Figure 9:
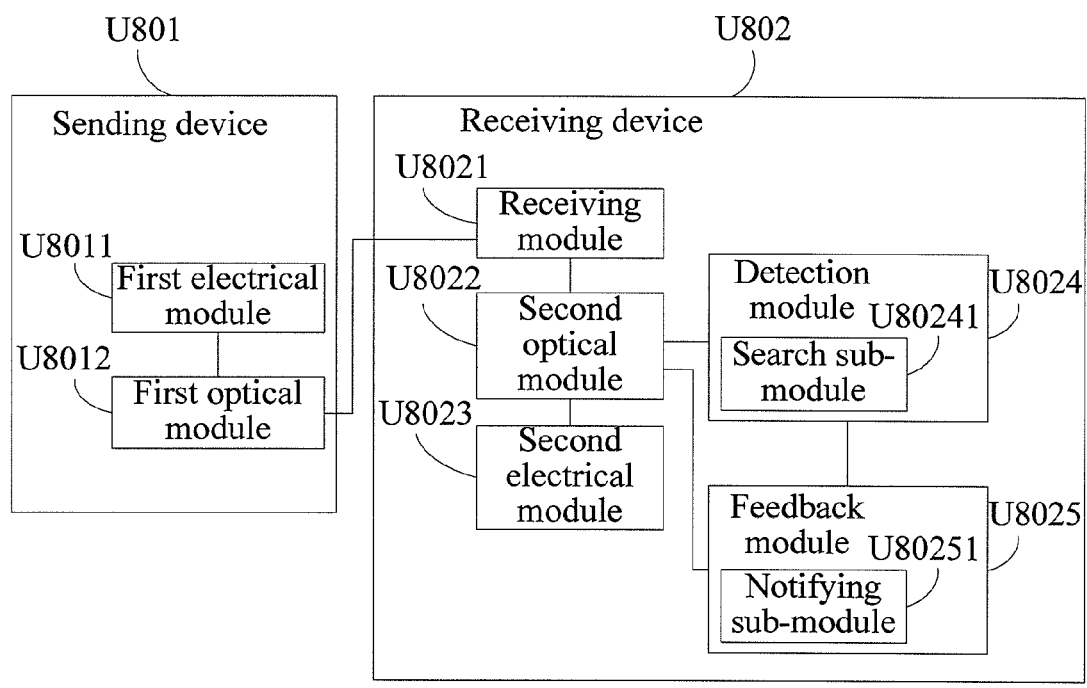
FIG. 9 is a schematic diagram of another system for transporting an OTUk frame according to an embodiment of the present invention.

Referring to FIG. 9, the sending device U801 includes:

a first electrical module U8011, configured to distribute the OTUk frame through round-robin distribution in a block mode to the multiple lanes, where each lane includes frame header information, and the frame header information includes a frame header byte for identifying lane information; and a first optical module U8012, configured to perform bit multiplexing on K/N lanes, perform high-order modulation on the multiplexed signals, and then combine the modulated signals into one optical signal for sending, where K is the number of the lanes and N is the order of the high order modulation.

The receiving device U802 includes: a receiving module U8021, configured to receive the optical signal sent by using the method of multi-lane distribution from the OTUk frame to the interface of the optical module;

a second optical module U8022, configured to convert the optical signal into the electrical signal, perform electrical equalization and demodulation on the electrical signal, perform bit demultiplexing on the demodulated signal to recover the multi-lane data; and a second electrical module U8023, configured to align and rearrange the data on each lane according to a lane sequence identifier included in an overhead frame header of the data on each lane, and perform block multiplexing on the aligned and rearranged data, so as to recover the OTUk frame.

In addition, in the embodiment of the present invention, feedback control is performed on an equalizer by detecting a bit error performance of each lane. In this case, the receiving device U802 further includes:

a detection module U8024, configured to detect the bit error performance of each lane according to the recovered multi-lane data; and a feedback module U8025, configured to perform feedback control on an equalizer algorithm using the performance detection result.

Various methods can be used for detecting the lane bit error performance, one of which is as follows.

The detection module U8024 may include a search sub-module U80241, configured to search an overhead frame header including a lane sequence identifier in the lane data.

Accordingly, the feedback module U8025 may include a notifying sub-module U80251, configured to notify the equalizer of switching to a control algorithm having higher convergence efficiency, if the information of the overhead frame header is searched out.

Persons of ordinary skill in the art should understand that all of or a part of the steps in the method according to the embodiments may be implemented by a program instructing relevant hardware. The program may be stored in a computer readable storage medium. When the program is run, the following steps are performed. An optical signal sent by using a method of multi-lane distribution from an OTUk frame to an interface of an optical module is received. The optical signal is converted into an electrical signal, which is electrically equalized and demodulated, and multi-lane data is recovered from the demodulated signal. The data on each lane is aligned and rearranged according to a lane sequence identifier included in an overhead frame header of the data on each lane. The OTUk frame is recovered according to the aligned and rearranged data. The storage medium may be a ROM/RAM, a magnetic disk or an optical disk.

The method and device for recovering the OTUk frame, the device for sending the OTUk frame, and the system for transporting the OTUk frame of the present invention are described in detail above. The principle and implementation of the present invention are expatiated herein through specific examples. The illustration in the above embodiments is used to facilitate the understanding of the method and core ideas of the present invention. Person having ordinary skill in the art can make variations and modifications to the present invention in terms of the specific implementations and application scopes according to the ideas of the present invention. Therefore, the specification shall not be construed as limitations to the present invention.

What is claimed is:

1. A method for recovering an OTUk frame, the method comprising:
    receiving an optical signal sent by using a method of multi-lane distribution from the OTUk frame to an interface of an optical module, wherein each lane comprises frame header information of the OTUk frame, and the frame header information comprises a frame header byte for identifying lane information;
    converting the optical signal into an electrical signal, performing electrical equalization and demodulation on the electrical signal, and recovering multi-lane data from the demodulated signal;
    aligning and rearranging the data on each lane, according to a lane sequence identifier comprised in an overhead frame header of the data on each lane, and recovering the OTUk frame according to the aligned and rearranged data;
    detecting a bit error performance of each lane according to the recovered multi-lane data;
    performing feedback control on an equalizer by using the performance detection result;
    wherein detecting the bit error performance of each lane comprises:
    searching the overhead frame header comprising the lane sequence identifier in the lane data; and
    wherein performing feedback control on the equalizer by using the performance detection result comprises:
    notifying the equalizer of switching to a control algorithm having higher convergence efficiency, if the information of the overhead frame header is searched out, that the information of the overhead frame header is searched out indicates a bit error rate of the lane is low, and a current equalizer algorithm completes the preliminary split of an original signal component from a crosstalk signal component.

2. The method according to claim 1, wherein the method of multi-lane distribution from the OTUk frame to the interface of the optical module comprises:
    distributing the OTUk frame through round-robin distribution in a block mode to the multiple lanes, wherein each lane comprises frame header information, and the frame header information comprises a frame header byte for identifying lane information; and
    performing bit multiplexing on K/N lanes, performing high-order modulation on the multiplexed signals, and then combining the modulated signals into one optical signal for sending, wherein K is the number of the lanes and N is the order of the high order modulation; and
    wherein recovering the multi-lane data from the demodulated signal comprises:
    performing bit demultiplexing on the demodulated signal to recover the multi-lane data; and
    wherein recovering the OTUk frame according to the aligned and rearranged data comprises:
    performing block multiplexing on the aligned and rearranged data, so as to recover the OTUk frame.

3. A device for recovering an OTUk frame, the device comprising:
    a receiving module, configured to receive an optical signal sent by using a method of multi-lane distribution from the OTUk frame to an interface of an optical module, wherein each lane comprises frame header information of the OTUk frame, and the frame header information comprises a frame header byte for identifying lane information;
    the optical module, configured to convert the optical signal into an electrical signal, perform electrical equalization and demodulation on the electrical signal, and recover multi-lane data from the demodulated signal;
    an electrical module, configured to align and rearrange the data on each lane, according to a lane sequence identifier comprised in an overhead frame header of the data on each lane, and recover the OTUk frame according to the aligned and rearranged data;
    a detection module, configured to detect a bit error performance of each lane, according to the recovered multi-lane data;
    a feedback module, configured to perform feedback control on an equalizer by using the performance detection result;
    wherein the detection module comprises:
        a search sub-module, configured to search the overhead frame header comprising the lane sequence identifier in the lane data;
    wherein the feedback module comprises:
        a notifying sub-module, configured to notify the equalizer of switching to a control algorithm having higher convergence efficiency, if the information of the overhead frame header is searched out, that the information of the overhead frame header is searched out indicates a bit error rate of the lane is low, and a current equalizer algorithm completes the preliminary split of an original signal component from a crosstalk signal component; and
    wherein the detection module, the feedback module, search sub-module and the notifying sub-module are implemented by a digital signal processor (DSP).

4. A system for transporting an OTUk frame, the system comprising:
    a sending device, configured to send an optical signal by using a method of multi-lane distribution from the OTUk frame to an interface of an optical module, wherein each lane comprises frame header information of the OTUk frame, and the frame header information comprises a frame header byte for identifying lane information;
    a receiving device, configured to convert the optical signal into an electrical signal, perform electrical equalization and demodulation on the electrical signal, and then recover multi-lane data from the demodulated signal;

align and rearrange the data on each lane; and recover the OTUk frame according to the aligned and rearranged data;

wherein the receiving device further comprises:
  a detection module, configured to detect a bit error performance of each lane according to the recovered multi-lane data;
  a feedback module, configured to perform feedback control on an equalizer by using the performance detection result;

wherein the detection module comprises:
  a search sub-module, configured to search an overhead frame header comprising a lane sequence identifier in the lane data;

wherein the feedback module comprises:
  a notifying sub-module, configured to notify the equalizer of switching to a control algorithm having higher convergence efficiency, if information of the overhead frame header is searched out, that the information of the overhead frame header is searched out indicates a bit error rate of the lane is low, and a current equalizer algorithm completes the preliminary split of an original signal component from a crosstalk signal component; and wherein the detection module, the feedback module, the search sub-module and the notifying sub-module are implemented by a digital signal processor (DSP).

5. The system according to claim 4, wherein the sending device comprises:
  a first electrical module, configured to distribute the OTUk frame through round-robin distribution in a block mode to the multiple lanes, wherein each lane comprises frame header information, and the frame header information comprises a frame header byte for identifying lane information; and
  a first optical module, configured to perform bit multiplexing on K/N lanes, perform high-order modulation on the multiplexed signals, and combine the modulated signals into one optical signal for sending, wherein K is the number of the lanes and N is the order of the high order modulation; and wherein the receiving device comprises:
  a receiving module, configured to receive the optical signal sent by using the method of multi-lane distribution from the OTUk frame to the interface of the optical module;
  a second optical module, configured to convert the optical signal into the electrical signal, perform electrical equalization and demodulation on the electrical signal, and perform bit demultiplexing on the demodulated signal to recover the multi-lane data; and
  a second electrical module, configured to align and rearrange the data on each lane according to a lane sequence identifier comprised in an overhead frame header of the data on each lane, and perform block multiplexing on the aligned and rearranged data so as to recover the OTUk frame.

* * * * *